(12) United States Patent
Pashias

(10) Patent No.: US 11,679,863 B2
(45) Date of Patent: Jun. 20, 2023

(54) AIRCRAFT PROPELLER AND AIRCRAFT

(71) Applicant: Dr. Ing. h.c. F. Porsche Aktiengesellschaft, Stuttgart (DE)

(72) Inventor: Christos Pashias, Weissach (DE)

(73) Assignee: DR. ING. H.C. F. PORSCHE AKTIENGESELLSCHAFT, Stuttgart (DE)

(*) Notice: Subject to any disclaimer, the term of this patent is extended or adjusted under 35 U.S.C. 154(b) by 0 days.

(21) Appl. No.: 17/725,568

(22) Filed: Apr. 21, 2022

(65) Prior Publication Data

US 2022/0340258 A1 Oct. 27, 2022

(30) Foreign Application Priority Data

Apr. 26, 2021 (DE) .................. 10 2021 110 538.2

(51) Int. Cl.
*B64C 11/24* (2006.01)

(52) U.S. Cl.
CPC .................... *B64C 11/24* (2013.01)

(58) Field of Classification Search
CPC ......... B64C 11/16; B64C 11/18; B64C 11/24; B64C 27/32; B64C 27/46; B64C 27/463; B64C 27/467; B64C 2027/7227; B64C 2027/725; F01D 1/32
See application file for complete search history.

(56) References Cited

U.S. PATENT DOCUMENTS

| | | | |
|---|---|---|---|
| 736,952 A * | 8/1903 | Fox | B64C 11/24 415/914 |
| 2,491,693 A | 12/1949 | Sivertsen | |
| 2,927,647 A * | 3/1960 | Serriades | B64C 11/24 416/21 |
| 2,942,672 A * | 6/1960 | Serriades | B64C 11/24 60/39.35 |
| 10,302,064 B2 | 5/2019 | Clingman et al. | |
| 2018/0297692 A1 | 10/2018 | Sargent et al. | |
| 2020/0010186 A1 | 1/2020 | Bender et al. | |

FOREIGN PATENT DOCUMENTS

| | | |
|---|---|---|
| DE | 102018116147 A1 | 1/2020 |
| DE | 102018116158 A1 | 1/2020 |
| DE | 102018116161 A1 | 1/2020 |
| EP | 0689990 B1 | 9/1996 |
| EP | 2631175 B1 | 9/2019 |

* cited by examiner

*Primary Examiner* — Christopher R Legendre
(74) *Attorney, Agent, or Firm* — Leydig, Voit & Mayer, Ltd.

(57) ABSTRACT

An aircraft propeller, including a propeller shaft and propeller blades or propeller airfoils secured on the propeller shaft, wherein an inlet-side flow channel and an outlet-side flow channel are introduced into each of the propeller blades or each of the propeller airfoils, wherein each inlet-side flow channel has an inlet opening and each outlet-side flow channel has an outlet opening on each of the propeller blades or propeller airfoils, wherein each inlet-side flow channel has a connection to the outlet-side flow channel of a respective other propeller blade or propeller airfoil such that air flowing in via the inlet-side flow channel flows out via the outlet-side flow channel of the respective other propeller blade or propeller airfoil, and wherein the inlet opening and the outlet opening of each propeller blade or propeller airfoil are arranged on different sides of the propeller blade or propeller airfoil.

13 Claims, 4 Drawing Sheets

AIRCRAFT PROPELLER AND AIRCRAFT

CROSS REFERENCE TO RELATED APPLICATIONS

This application claims benefit to German Patent Application No. DE 10 2021 110 538.2, filed on Apr. 26, 2021, which is hereby incorporated by reference herein.

FIELD

The invention relates to an aircraft propeller and to an aircraft.

BACKGROUND

DE 10 2018 116 161 A1 discloses an aircraft designed as a vertical take-off aircraft having a fuselage and an aircraft passenger cell provided by the fuselage. The aircraft passenger cell is also referred to as a passenger cabin.

DE 10 2018 116 147 A1 discloses another aircraft designed as a vertical take-off aircraft, which has propellers that engage on the fuselage of the aircraft and can be folded down under the fuselage. These propellers are also referred to as aircraft propellers.

DE 10 2018 116 158 A1 discloses an aircraft which is likewise designed as a vertical take-off aircraft having an aircraft propeller.

Aircraft propellers can tend to vibrate, particularly in the case of an oblique incident flow in forward flight. There is a need to reduce or completely avoid such vibrations.

EP 2 631 175 B1 discloses an aircraft propeller having a propeller shaft and having propeller airfoils secured on the propeller shaft, said propeller airfoils also being referred to as propeller blades. A flow channel for air, which has an inlet opening for air and an outlet opening for air, is introduced into the respective propeller blade. The inlet opening of the flow channel is arranged adjacent to a root of a trailing edge of the propeller blade, at a short distance from the propeller shaft. The outlet opening is positioned at a greater distance from the propeller shaft, more specifically on an opposite side of the propeller blade.

U.S. Pat. No. 10,302,064 B2, EP 0 689 990 B1 and US 2018/0,297,692 A1 disclose further aircraft propellers having a propeller shaft and having propeller blades secured on the propeller shaft.

SUMMARY

In an embodiment, the present disclosure provides an aircraft propeller, comprising a propeller shaft and propeller blades or propeller airfoils secured on the propeller shaft, wherein an inlet-side flow channel and an outlet-side flow channel are introduced into each of the propeller blades or each of the propeller airfoils, wherein each inlet-side flow channel has an inlet opening and each outlet-side flow channel has an outlet opening on each of the propeller blades or propeller airfoils, wherein each inlet-side flow channel has a connection to the outlet-side flow channel of a respective other propeller blade or propeller airfoil such that air flowing in via the inlet-side flow channel flows out via the outlet-side flow channel of the respective other propeller blade or propeller airfoil, and wherein the inlet opening and the outlet opening of each propeller blade or propeller airfoil are arranged on different sides of the propeller blade or propeller airfoil.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
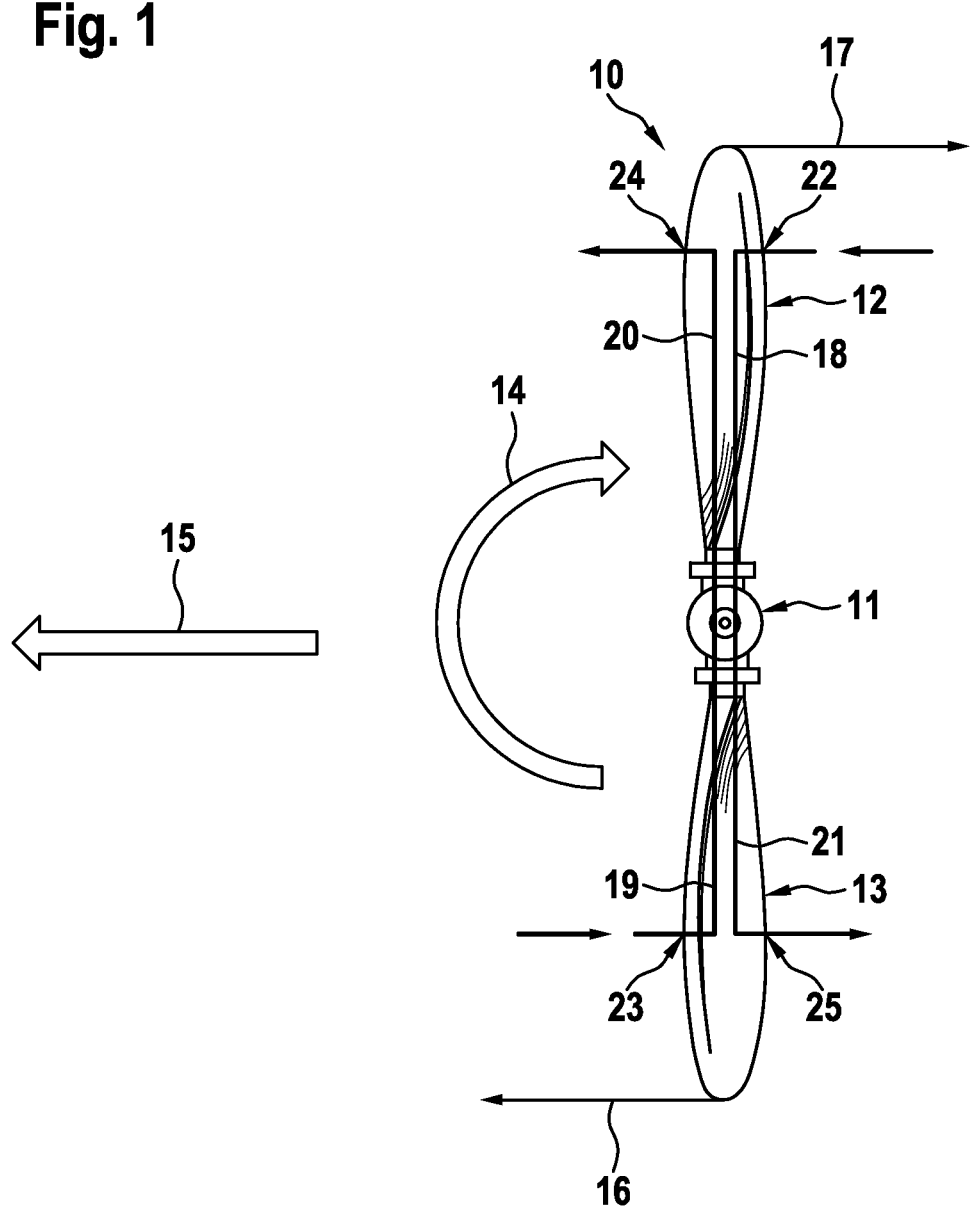
FIG. 1 shows a schematic view of an aircraft propeller according to an embodiment of the invention.

In an embodiment, the invention provides a novel aircraft propeller and an aircraft having such an aircraft.

The aircraft propeller according to an embodiment of the invention has a propeller shaft and propeller blades or propeller airfoils secured on the propeller shaft. A respective inlet-side flow channel and a respective outlet-side flow channel are introduced into each propeller blade or propeller airfoil. The inlet-side flow channel has an inlet opening and the outlet-side flow channel has an outlet opening on the respective propeller blade or propeller airfoil. The inlet-side flow channel of a respective propeller blade or propeller airfoil is connected to the outlet-side flow channel of a respective other propeller blade or propeller airfoil in such a way that air flowing in via the inlet-side flow channel of the respective propeller blade or propeller airfoil flows out via the outlet-side flow channel of the respective other propeller blade or propeller airfoil. The inlet opening and the outlet opening of the respective propeller blade or propeller airfoil are arranged on different sides of the respective propeller blade or propeller airfoil.

The aircraft propeller according to an embodiment of the invention proposes an aircraft propeller in which the inlet-side flow channel of a respective propeller airfoil or propeller blade is connected to an outlet-side flow channel of a respective other propeller airfoil or propeller blade.

The respective inlet-side flow channel has a respective inlet opening and the respective outlet-side flow channel has a respective outlet opening on the respective propeller airfoil or propeller blade, wherein the inlet opening and the outlet opening are arranged on different sides. Thus, the respective inlet opening is arranged on a front side, as viewed in the direction of rotation or rotational direction of the respective propeller airfoil or propeller blade, and the respective outlet opening is arranged on a rear side thereof, as viewed in the direction of rotation of the respective propeller airfoil or propeller blade. With such an aircraft propeller, it is possible to reduce or even completely eliminate vibrations of the aircraft propeller, particularly in forward flight.

In the case of the aircraft propeller according to an embodiment of the invention, a respective connection between a respective inlet-side flow channel and a respective outlet-side flow channel of different propeller blades or propeller airfoils preferably extends through the propeller shaft. This permits particularly advantageous connection of the channels of different propeller blades to reduce propeller vibrations of the aircraft propeller, particularly in forward flight.

In the case of the aircraft propeller according to an embodiment of the invention, that propeller airfoil whose inlet-side flow channel is connected to the outlet-side flow channel of a respective other propeller airfoil is preferably offset by between 90° and 180° with respect to the other propeller airfoil, relative to the propeller shaft. In the case of an aircraft propeller having two propeller airfoils, the propeller airfoils, the inlet-side and outlet-side flow channels of which are connected, are offset by 180°. In the case of three propeller airfoils, the propeller airfoils, the inlet-side and outlet-side flow channels of which are connected, are offset by 120°. In the case of an aircraft propeller with four propeller airfoils, the propeller airfoils, the inlet-side and outlet-side flow channels of which are connected, are offset by 90° or 180° on the propeller shaft.

The aircraft propeller according to an embodiment of the invention has a propeller shaft and propeller blades or propeller airfoils secured on the propeller shaft, wherein a respective inlet-side flow channel and a respective outlet-side flow channel are introduced into each propeller blade or each propeller airfoil. The inlet-side flow channel has an inlet opening and the outlet-side flow channel has an outlet opening on the respective propeller blade or propeller airfoil. The inlet-side flow channel of a respective propeller blade or propeller airfoil is connected to the outlet-side flow channel of the same propeller blade or propeller airfoil in such a way that air flowing in via the inlet-side flow channel of the respective propeller blade or propeller airfoil flows out via the outlet-side flow channel of the same propeller blade or propeller airfoil. A respective connection between a respective inlet-side flow channel and the respective outlet-side flow channel extends in a U shape adjacent to the propeller shaft. The inlet opening and the outlet opening of the respective propeller blade or propeller airfoil are formed on different sides of the respective propeller blade or propeller airfoil and both are at a greater distance from the propeller shaft than the connection of the respective propeller blade or propeller airfoil between a respective inlet-side and outlet-side flow channel.

With the aircraft propeller according to embodiments of the invention too, propeller vibrations of the aircraft propeller can be reduced or even completely eliminated, particularly in forward flight.

According to a development of the aircraft propeller according to an embodiment, the inlet opening and the outlet opening of the respective propeller blade or propeller airfoil are at the same distance from the propeller shaft.

It is also possible for the inlet opening and the outlet opening of the respective propeller blade or propeller airfoil to be at different distances from the propeller shaft, wherein the distance of the inlet opening from the propeller shaft is greater than the distance of the outlet opening from the propeller shaft.

The aircraft is defined in claim 10.

FIG. 1 shows a first exemplary embodiment of an inventive aircraft propeller 10 according to an embodiment of the invention presented here. In FIG. 1, the aircraft propeller 10 has a propeller shaft 11 and two propeller airfoils 12, 13 which are secured on the propeller shaft 11 and which, in FIG. 1, are situated diametrically opposite one another on the propeller shaft 11, that is to say are offset by 180° relative to the propeller shaft 11. Propeller airfoils are also referred to as propeller blades.

In FIG. 1, an arrow 14 indicates the rotational direction or direction of rotation of the aircraft propeller 10 and thus of the propeller airfoils 12, 13. An arrow 15 indicates the forward flight direction of an aircraft having the aircraft propeller 10.

In the state shown in FIG. 1, propeller airfoil 13 is the "leading" propeller airfoil and propeller airfoil 12 is the "trailing" propeller airfoil. The rotational direction or direction of movement of propeller airfoil 13, which is indicated by the arrow 16, is accordingly in the direction of flight 15, and the rotational direction or direction of movement of propeller airfoil 12, which is indicated by the arrow 17, is opposite to the direction of flight 15. Of course, the leading propeller airfoil and the trailing propeller airfoil change continuously owing to rotation or turning of the aircraft propeller 10.

A respective inlet-side flow channel 18 and 19 and a respective outlet-side flow channel 20 and 21 are introduced into each propeller airfoil 12, 13. Thus, inlet-side flow channel 18 and outlet-side flow channel 20 are introduced into propeller airfoil 12. Inlet-side flow channel 19 and outlet-side flow channel 21 are introduced into propeller airfoil 13.

Here, each inlet-side flow channel 18, 19 has an inlet opening 22 and 23, respectively, and each outlet-side flow channel 20 and 21 has an outlet opening 24 and 25, respectively. Thus, the inlet-side flow channel 18 introduced into propeller airfoil 12 has inlet opening 22 and the outlet-side flow channel 20 introduced into propeller airfoil 12 has outlet opening 24, which are arranged or formed on different sides of propeller airfoil 12, relative to propeller airfoil 12.

The same applies to propeller airfoil 13. The inlet-side flow channel 19 introduced into propeller airfoil 13 has inlet opening 23 and the outlet-side flow channel 21 introduced into propeller airfoil 13 has outlet opening 25, wherein this inlet opening 23 and this outlet opening 25 of propeller airfoil 13 are again arranged on different sides of propeller airfoil 13.

Viewed in the direction of rotation or rotational direction 14 of the aircraft propeller 10, the inlet openings 22, 23 are formed on a front side of the respective propeller airfoil 12, 13 and the outlet openings 24, 25 are formed on a rear side of the respective propeller airfoil 12, 13.

According to an embodiment of the present invention, the inlet-side flow channel 18 or 19 of a respective propeller blade 12 or 13 is connected to the outlet-side flow channel 21 or 20 of a respective other propeller blade 13 or 12, wherein this connection of the inlet-side flow channels and the outlet-side flow channels extends through the propeller shaft 11.

Air which flows into the inlet-side flow channel 19 of propeller airfoil 13 via the inlet opening 23 of propeller airfoil 13 flows out via the propeller shaft 11 into the outlet-side flow channel 20 of the other propeller airfoil 12 and via the outlet opening 24 of the latter. Here, inflow takes place on the side of propeller airfoil 13 which is at the front in the direction of rotation 14 or rotational direction and outflow takes place on the side of propeller airfoil 12 which is at the rear in the direction of rotation 14 or rotational direction.

Likewise, air which flows into the inlet-side flow channel 18 of propeller airfoil 12 via the inlet opening 22 of the latter flows out of the aircraft propeller 10 via the connection and thus via the propeller shaft 11 in the direction of the outlet-side flow channel 21 of propeller airfoil 13 and via the outlet opening 25 of the latter.

In the exemplary embodiment shown in FIG. 1, in the region of each propeller airfoil 12, 13, the openings of the respective propeller airfoil 12, 13, that is to say the inlet opening 22 and 23, respectively, and the outlet opening 24 and 25, respectively, of the respective propeller airfoil 12 and 13 are at an identical distance from the propeller shaft 11. However, it is also possible for the outlet openings 24, 25 to be at a shorter distance from the propeller shaft 11 than the inlet openings 22, 23.

In the case of the aircraft propeller 10 shown in FIG. 1, which has only two propeller airfoils 12, 13, the propeller airfoils 12, 13, the inlet-side flow channels 18 and 19 and outlet-side flow channels 21 and 20 of which are respectively connected to one another, are offset by 180° with respect to one another, that is to say are situated diametrically opposite one another on the propeller shaft 11.

Figure 2:
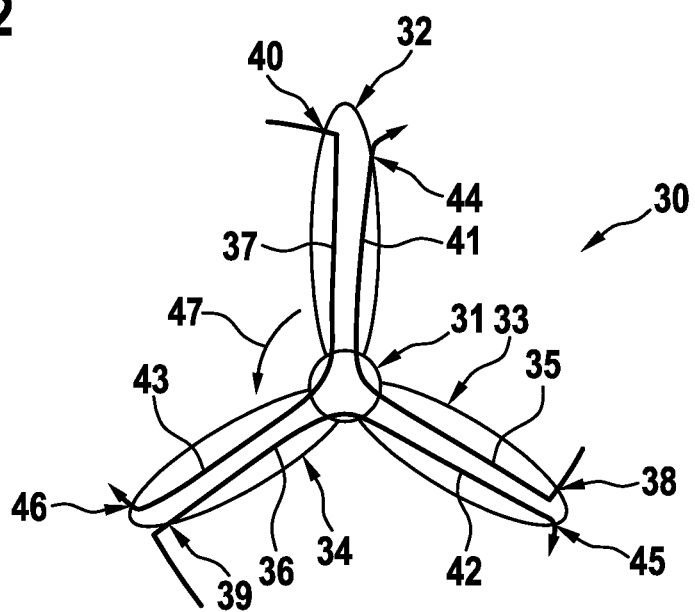
FIG. 2 shows a schematic view of an aircraft propeller according to an embodiment of the invention.

FIG. 2 shows a second exemplary embodiment of an aircraft propeller 30 according to the invention according to an embodiment of the invention, which has a propeller shaft 31 and three propeller airfoils 32, 33, 34 secured on the propeller shaft 31. Adjacent propeller airfoils 32, 33, 34 are in each case offset by 120° with respect to one another on the propeller shaft 31. In this case, once again, a respective inlet-side flow channel 35, 36, 37 with a respective inlet opening 38, 39, 40 and an outlet-side flow channel 41, 42, 43 with a respective outlet opening 44, 45, 46 are introduced into each propeller airfoil 32, 33, 34. In FIG. 2, the inlet-side flow channel 35 of propeller airfoil 33 is connected to the outlet-side flow channel 41 of propeller airfoil 32. Likewise, the inlet-side flow channel 36 of propeller airfoil 34 is connected to the outlet-side flow channel 42 of propeller airfoil 33. Furthermore, the inlet-side flow channel 37 of propeller airfoil 32 is connected to the outlet-side flow channel 43 of propeller airfoil 34, in each case via a connection extending through the propeller shaft 31. The propeller airfoils, the inlet-side and outlet-side flow channels of which are connected to one another, are accordingly offset by 120° with respect to one another in FIG. 2.

In FIG. 2, an arrow 47 indicates the direction of rotation of the aircraft propeller 30. In FIG. 2, as in FIG. 1, the respective inlet opening 38, 39, 40 of the respective propeller airfoil 32, 33, 34 is also formed on a front side in the direction of rotation 47 of the aircraft propeller and thus of the propeller airfoil, and the outlet opening of the respective propeller airfoil is formed on a rear side of the respective propeller airfoil in the direction of rotation 47 of the respective propeller airfoil.

Figure 3:
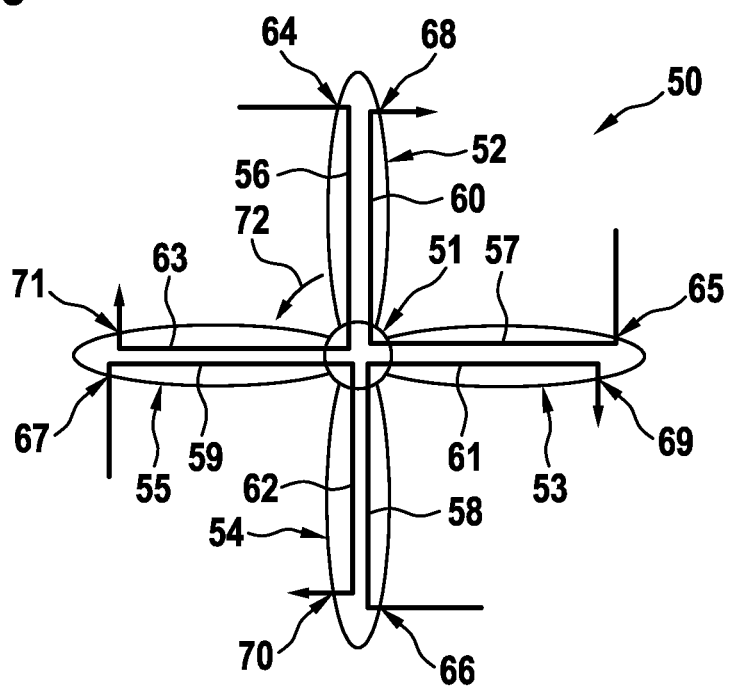
FIG. 3 shows a schematic view of an aircraft propeller according an embodiment of the invention.
Figure 4:
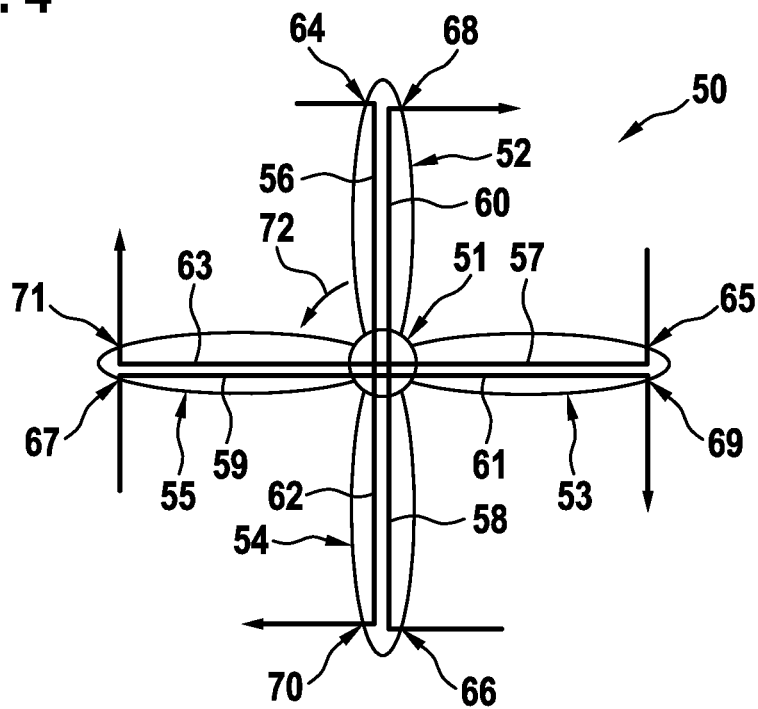
FIG. 4 shows a schematic view of an aircraft propeller according to an embodiment of the invention.
Figure 5:
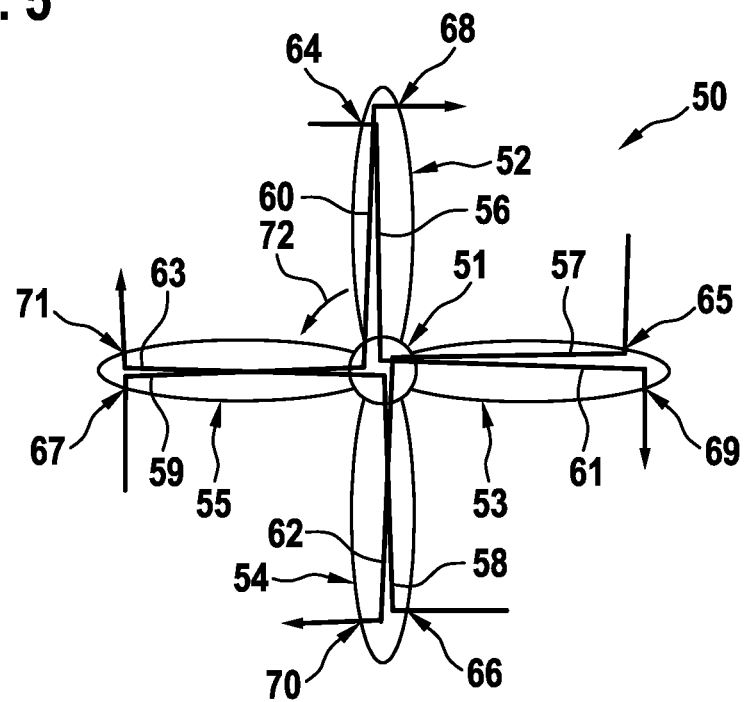
FIG. 5 shows a schematic view of an aircraft propeller according to an embodiment of the invention.

FIGS. 3, 4 and 5 show further exemplary embodiments of aircraft propellers 50 according to an embodiment of the invention, each having four propeller airfoils 52, 53, 54, 55 secured on a propeller shaft 51. Adjacent propeller airfoils 52, 53, 54, 55 are in each case offset by 90° with respect to one another on the propeller shaft 51. Once again, a respective inlet-side flow channel 56, 57, 58, 59 and a respective outlet-side flow channel 60, 61, 62, 63 are introduced into each propeller airfoil 52, 53, 54, 55, wherein once again a respective inlet-side flow channel of a respective propeller blade or propeller airfoil is connected to an outlet-side flow channel of a respective other propeller blade or propeller airfoil via a connection extending through the propeller shaft 51. In this case, each inlet-side flow channel 56, 57, 58, 59 has an inlet opening 64, 65, 66, 67, and each outlet-side flow channel 60, 61, 62, 63 has an outlet opening 68, 69, 70, 71, wherein, in the region of each propeller airfoil 52, 53, 54, 55, the respective inlet opening and the respective outlet opening are formed or arranged on different sides of the respective propeller airfoil.

In FIG. 3, the inlet-side flow channel 56 of propeller airfoil 52 is connected to the outlet-side flow channel 63 of propeller airfoil 55. The inlet-side flow channel 57 of propeller airfoil 53 is connected to the outlet-side flow channel 60 of propeller airfoil 52. The inlet-side flow channel 58 of propeller airfoil 54 is connected to the outlet-side flow channel 61 of propeller airfoil 53. The inlet-side flow channel 59 of propeller airfoil 55 is connected to the outlet-side flow channel 62 of propeller airfoil 54.

In FIG. 3, those propeller airfoils, the inlet-side and outlet-side flow channels of which are connected, are accordingly offset by 90° with respect to one another on the propeller shaft.

In FIG. 4, just as in FIG. 1, the inlet-side and outlet-side flow channels of those propeller airfoils which are offset by 180° with respect to one another, relative to the propeller shaft 51, are connected to one another. Thus, the inlet-side flow channel 56 of propeller airfoil 52 is connected to the outlet-side flow channel 62 of propeller airfoil 54. Furthermore, the inlet-side flow channel 57 of propeller airfoil 53 is connected to the outlet-side flow channel 63 of propeller airfoil 55. The inlet-side flow channel 58 of propeller airfoil 54 is connected to the outlet-side flow channel 60 of propeller airfoil 52. The inlet-side flow channel 59 of propeller airfoil 55 is connected to the outlet-side flow channel 61 of propeller airfoil 53.

FIG. 5 shows an embodiment of an aircraft propeller 50 in which those propeller airfoils, the inlet-side flow channels and outlet-side flow channels of which are connected to one another, are again offset by 90° with respect to one another, based on the rotational direction of the propeller 50. Thus, in FIG. 5, the inlet-side flow channel 56 of propeller airfoil 52 is connected to the outlet-side flow channel 61 of propeller airfoil 53. Furthermore, the inlet-side flow channel 59 of propeller airfoil 55 is connected to the outlet-side flow channel 60 of propeller airfoil 52. Furthermore, the inlet-side flow channel 58 of propeller airfoil 54 is connected to the outlet-side flow channel 63 of propeller airfoil 55. Furthermore, the inlet-side flow channel 57 of propeller airfoil 53 is connected to the outlet-side flow channel 62 of propeller airfoil 54.

Whether the variant of FIG. 3 or FIG. 4 or FIG. 5 is preferred in the case of an aircraft propeller 50 with four propeller airfoils also depends on a delay in the pneumatic transfer from the respective inlet-side flow channel in the direction of the respective outlet-side flow channel.

In the case of a short delay in pneumatic transfer, the variant of FIG. 4 with the propeller airfoils connected via their flow channels at 180° is preferred. In the case of longer delays, the variants of FIGS. 3 and 5 are preferred.

The variants of FIGS. 3 and 5 differ in that, in FIG. 3, of two propeller airfoils connected via a respective inlet-side flow channel and a respective outlet-side flow channel, the propeller airfoil with the inlet-side flow channel trails the propeller airfoil with the outlet-side flow channel, when viewed in the direction of rotation (arrow 72) of the propeller, whereas, in FIG. 5, the propeller airfoil with the inlet-side flow channel leads the propeller airfoil with the outlet-side flow channel.

In FIGS. 3 to 5, as in FIG. 1, the respective inlet opening 64, 65, 66, 67 of the respective propeller airfoil is also formed on a front side in the direction of rotation 72 of the aircraft propeller 50 and thus of the propeller airfoil, and the outlet opening 68, 69, 70, 71 of the respective propeller airfoil is formed on a rear side of the respective propeller airfoil in the direction of rotation 72.

All the exemplary embodiments in FIGS. 1 to 5, which show an aircraft propeller 10, 30, 50 according to an embodiment of the present invention, have in common that in each case an inlet-side flow channel of a respective propeller airfoil and an outlet-side flow channel of a respective other propeller airfoil are connected to one another, more specifically by a connection extending via the respective propeller shaft 11, 31, 51.

Figure 6:
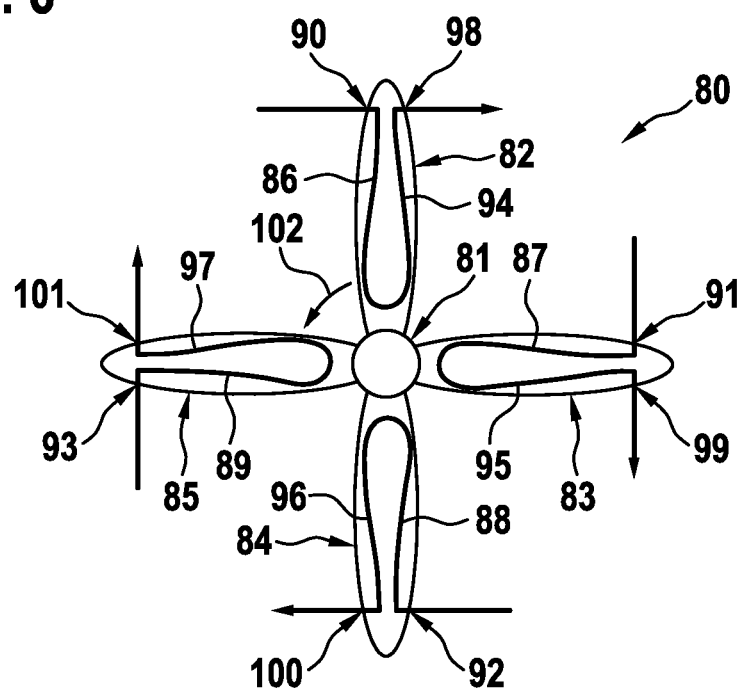
FIG. 6 shows a schematic view of an aircraft propeller according to an embodiment of the invention.

In contrast, FIG. 6 shows a schematic illustration of an aircraft propeller 80 according to an embodiment of the invention with a propeller shaft 81 and, in this case, four propeller airfoils 82, 83, 84, 85.

In FIG. 6, a respective inlet-side flow channel 86, 87, 88, 89 with an inlet opening 90, 91, 92, 93 and a respective outlet-side flow channel 94, 95, 96, 97 with a respective outlet opening 98, 99, 100, 101 are introduced into each of the propeller airfoils.

In FIG. 6, the inlet-side flow channel 86, 87, 88, 89 of the respective propeller airfoil 82, 83, 84, 85 is connected to the outlet-side flow channel 94, 95, 96, 97 of the same propeller airfoil 82, 83, 84, 85, more specifically via a U-shaped connection which is arranged adjacent to the propeller shaft 81.

The inlet openings 90, 91, 92, 93 and the outlet openings 98, 99, 100, 101 are arranged at a distance from the propeller shaft 81, more specifically in each case at the same distance from the propeller shaft 81 in FIG. 6.

However, it is also possible for the respective outlet openings 99, 100, 101 to be at a shorter distance from the propeller shaft 81 than the respective inlet openings 90, 91, 92, 93 but at a greater distance from the propeller shaft 81 than the respective U-shaped connection of the respective inlet-side flow channel to the respective outlet-side flow channel of the respective propeller airfoil.

In FIG. 6, as in FIG. 1, the respective inlet opening 90, 91, 92, 93 of the respective propeller airfoil is also formed on a front side in the direction of rotation 102 of the aircraft propeller 80 and thus of the propeller airfoil, and the outlet opening 98, 9, 100, 101 of the respective propeller airfoil is formed on a rear side of the respective propeller airfoil in the direction of rotation 102.

The aircraft propellers 10, 30, 50, 80 according to the invention are preferably open propellers of the kind used particularly on helicopters. However, the aircraft propellers 10, 30, 40, 80 according to the invention can also be designed as ducted propellers.

With the invention, it is possible to use different energy levels at the propeller airfoils in order to reduce or even completely avoid propeller vibrations, particularly in forward flight.

For this purpose, an inlet-side flow channel with an inlet opening and an outlet-side flow channel with an outlet opening are introduced into each propeller airfoil, said channels being connected to one another, in such a way that inlet-side flow channels and outlet-side flow channels of different propeller airfoils are connected to one another. The inlet opening of the respective propeller airfoil is formed on a front side in the direction of rotation of the aircraft propeller and thus of the respective propeller airfoil, and the outlet opening of the respective propeller airfoil is formed on a rear side of the respective propeller airfoil in the direction of rotation of the aircraft propeller and thus of the respective propeller airfoil.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An aircraft propeller, comprising:
a propeller shaft; and
propeller blades or propeller airfoils secured on the propeller shaft,
wherein each of the propeller blades or each of the propeller airfoils has an inlet-side flow channel and an outlet-side flow channel, wherein each inlet-side flow channel has an inlet opening and each outlet-side flow channel has an outlet opening on each of the propeller blades or the propeller airfoils,
wherein each inlet-side flow channel is connected to the outlet-side flow channel of a respective other propeller blade or a respective other propeller airfoil via a respective connection such that air flowing in via the inlet-side flow channel flows out via the outlet-side flow channel of the respective other propeller blade or the respective other propeller airfoil, and
wherein the inlet opening and the outlet opening of each propeller blade of the propeller blades or each propeller airfoil of the propeller airfoils are arranged on different sides of the respective propeller blade or the respective propeller airfoil.

2. The aircraft propeller as claimed in claim 1, wherein, for each of the propeller blades or each of the propeller airfoils, the respective connection extends through the propeller shaft.

3. The aircraft propeller as claimed in claim 1, wherein each of the propeller blades or each of the propeller airfoils is offset by between 90° and 180° with respect to the respective other propeller blade or the respective other propeller airfoil, relative to the propeller shaft.

4. The aircraft propeller as claimed in claim 1, wherein each of the propeller blades or each of the propeller airfoils is diametrically opposite the propeller shaft with respect to the respective other propeller blade or the respective other propeller airfoil.

5. The aircraft propeller as claimed in claim 1, wherein, for each of the propeller blades or the propeller airfoils, the respective inlet opening and the respective outlet opening of the respective propeller blade or the respective propeller airfoil is arranged at a same distance from the propeller shaft.

6. The aircraft propeller as claimed in claim 1, wherein, for each of the propeller blades or the propeller airfoils, the respective inlet opening and the respective outlet opening of the respective propeller blade or the respective propeller airfoil are arranged at different distances from the propeller shaft, wherein the distance of the respective inlet opening of the respective propeller blade or the respective propeller airfoil from the propeller shaft is greater than the distance of the respective outlet opening of the respective propeller blade or the respective propeller airfoil from the propeller shaft.

7. The aircraft propeller as claimed in claim 1, wherein, for each of the propeller blades or the propeller airfoils, the respective inlet opening of the respective propeller blade or the respective propeller airfoil is formed on a front side in a direction of rotation of the aircraft propeller and the respective outlet opening of the respective propeller blade or the respective propeller airfoil is formed on a rear side in the direction of rotation of the aircraft propeller.

8. The aircraft propeller as claimed in claim 1, wherein the aircraft propeller is designed as an open propeller or as a ducted propeller.

9. An aircraft, comprising:
a fuselage which provides an aircraft passenger cell; and
at least one aircraft propeller as claimed in claim 1.

10. An aircraft propeller, comprising:
a propeller shaft; and
propeller blades or propeller airfoils secured on the propeller shaft,
wherein each of the propeller blades or each of the propeller airfoils has a respective inlet-side flow channel, which has an inlet opening, and has a respective outlet-side flow channel, which has an outlet opening
wherein each inlet-side flow channel is connected to the outlet-side flow channel of a same propeller blade or propeller airfoil via a connection such that air flowing in via the inlet-side flow channel flows out via the outlet-side flow channel of the same propeller blade or propeller airfoil,
wherein each connection extends in a U shape adjacent to the propeller shaft,
wherein the inlet opening and the outlet opening of each propeller blade of the propeller blades or each propeller airfoil of the propeller airfoils are formed on different sides of the respective propeller blade or the respective propeller airfoil,
wherein the inlet opening and the outlet opening of each of the propeller blades or each of the propeller airfoils is arranged at a greater distance from the propeller shaft than the connection of the respective inlet-side flow channel of the respective propeller blade or propeller airfoil, and
wherein, for each of the propeller blades or the propeller airfoils, the inlet opening and the outlet opening of the respective propeller blade or the respective propeller airfoil are arranged at different distances from the propeller shaft such that no portion of the inlet opening is at a same distance from the respective propeller shaft as any portion of the outlet opening of the respective propeller blade or the respective propeller airfoil, and the distance of the inlet opening of the respective propeller blade or the respective propeller airfoil from the propeller shaft is greater than the distance of the outlet opening of the respective propeller blade or the respective propeller airfoil from the propeller shaft.

11. The aircraft propeller as claimed in claim 10, wherein, for each of the propeller blades or the propeller airfoils, the respective inlet opening of the respective propeller blade or the respective propeller airfoil is formed on a front side in a direction of rotation of the aircraft propeller and the respective outlet opening of the respective propeller blade or the respective propeller airfoil is formed on a rear side in the direction of rotation of the aircraft propeller.

12. The aircraft propeller as claimed in claim 10, wherein the aircraft propeller is designed as an open propeller or as a ducted propeller.

13. An aircraft, comprising:
a fuselage which provides an aircraft passenger cell; and
at least one aircraft propeller as claimed in claim 10.

\* \* \* \* \*